United States Patent

[11] 3,614,241

[72] Inventors Lloyd Clifford Sanford
 Acton;
 John Augustus O'Brien, Reading, both of Mass.
[21] Appl. No. 47,704
[22] Filed June 19, 1970
[45] Patented Oct. 19, 1971
[73] Assignee Itek Corporation
 Lexington, Mass.
 Continuation-in-part of application Ser. No. 582,065, Sept. 26, 1966, now Patent No. 3,518,013.

[54] AUTOMATIC RECORDING DENSITOMETER WHICH SIMULTANEOUSLY DETERMINES AND RECORDS THE OPTICAL DENSITY OF A STRIP OF PHOTOGRAPHIC FILM
 17 Claims, 6 Drawing Figs.
[52] U.S. Cl. .......................................... 356/175,
  250/219 FR, 356/203
[51] Int. Cl. .......................................... G01j 3/50,
  G01n 21/22
[50] Field of Search .......................................... 250/219
  FR; 356/203, 202

[56] References Cited
 UNITED STATES PATENTS
 2,582,073 1/1952 Scudder .................. 356/203 X
 2,972,925 2/1961 Armbrecht et al. ........... 356/203 X

*Primary Examiner*—Ronald L. Wibert
*Assistant Examiner*—Orville B. Chew, II
*Attorneys*—Homer O. Blair, Robert L. Nathans and William C. Roch ABSTRACT: A densitometer which simultaneously determines and records the optical density of a strip of photographic film. The filmstrip is mounted on a first portion of a curved platen. A piece of graph paper is mounted on a second portion of the curved platen adjacent to the first portion. A unitary arm is mounted above the curved platen and moves in an arcuate path parallel to the surface of the support platen. The moving unitary arm scans the density of the film and simultaneously records the density on the graph paper. The second portion of the curved platen, on which the graph paper is mounted, has a larger radius of curvature than the first portion of the curved platen on which the film is mounted. The mechanical advantage of the larger radius enables the density to be recorded on a graph having a longer abscissa than the length of the filmstrip. The densitometer has the capability of measuring both reflection and transmission density. For transmission density a light source is located in the unitary scanning arm and directs light through the filmstrip to a photomultiplier tube located below the filmstrip. The output of the photomultiplier tube is utilized to drive a recorder which plots the density on the graph paper. For reflection density a light source is located beneath the filmstrip and directs light against the lower surface of the filmstrip. The reflected light is then directed to the same photomultiplier tube used for transmission density. The densitometer, while measuring either reflection or transmission density, has the capability of measuring the density of red, green, or blue colors in the filmstrip. This capability is added by having a cylindrical filter located around the photomultiplier tube. The cylindrical filter has green, red, and blue filter portions. The density of a particular color is measured by interposing that filter in the light path, thereby allowing only the light of that color to pass to the photomultiplier tube.

JOHN A. O'BRIEN
LLOYD C. SANFORD
INVENTORS.

BY *William C. Roch*

ATTORNEY.

JOHN A. O'BRIEN
LLOYD C. SANFORD
INVENTORS.

BY William C. Rock

ATTORNEY.

JOHN A. O'BRIEN
LLOYD C. SANFORD
INVENTORS.

BY William C. Roch

ATTORNEY.

AUTOMATIC RECORDING DENSITOMETER WHICH SIMULTANEOUSLY DETERMINES AND RECORDS THE OPTICAL DENSITY OF A STRIP OF PHOTOGRAPHIC FILM

This application is a continuation-in-part of Pat. application Ser. No. 582,065, filed Sept. 26, 1966 for "Automatic Recording Densitometer," now U.S. Pat. No. 3,518,013.

BACKGROUND OF THE INVENTION

The present invention relates generally to the field of densitometry, and more particularly pertains to a new and improved determining densitometer for determining and plotting the transmission or reflection density of a film strip.

The high-precision, high-volume film processing industry and the photographic materials manufacturing industry have a critical need for rapid, accurate and repeatable photographic densitometry. The graphic arts industry and the lithographics trade require precision reflection densitometry for photomechanical reproduction. This invention satisfies both these needs.

As is well known to those skilled in the art, the response characteristics of a film strip are measured by exposing the film strip through an optical density wedge which has a variable transmittance along the length of the density wedge. The film is thereafter developed, and the resulting gray scale density variations are measured. These density variations are plotted against the log of the exposure required to produce the variation. The log of the exposure is known from the product of the intensity of the light source and the exposure time, and the characteristics of the optical density wedge. The plotted data is called an H and D or D-log E curve, and describes the photographic density of the particular film as a function of exposure. This process is often performed manually by constructing the graph point by point. Where automation is employed, relatively complex systems are utilized to convert the density variations into a D-log E curve. These prior art systems have been relatively bulky, expensive, and inaccurate.

SUMMARY OF THE INVENTION

This invention provides a simple, inexpensive and reliable densitometer which automatically and rapidly produces a D-log E curve. The density of a film strip is scanned, and the determined density is simultaneously recorded on graph paper. This simultaneous scanning and recording eliminates errors in a D-log E curve due to possible misalignment of points on the film strip with the abscissa of the D-log E curve. The film strip and graph paper are located adjacent to each other on different portions of a curved support platen. A rigid, pivotal arm travels in an arcuate path parallel to the surface of the support platen. This operation results in a continuous scan of the density of the film strip and a continuous recording of the density upon a recording medium.

The elimination of errors in density readings is extremely important when a densitometer is utilized to analyze an aerial reconnaissance type of film, or any other film used for reproduction or scientific purposes wherein accuracy and detail of the film are of the utmost importance. The use of a curved support platen enables the film strip to be pressed flat against the platen and held accurately in an arcuate plane which is scanned by the pivotal scanning arm. Errors in density readings due to deviations of the film strip from the scanned plane are eliminated. The curved platen also enables the film strip to be held flat in the arcuate plane without the use of a glass clamp, which is normally required in a densitometer using a flat platen. The glass clamp introduces several sources of error into the system. A glass clamp causes scattering of the light, which in turn makes the system less accurate and precise. Also, a glass clamp varies the spectral content of the light transmitted through the film strip. This is very disadvantageous if the density of one color is being analyzed in the film strip. A glass clamp also normally introduces slight air pockets between the film and the clamp. These air pockets, which are trapped between the film and the glass plate, cause Newton's rings, which are concentric, wavy rings in that portion of the projection. These rings introduce error into a very precise densitometer.

Another advantageous feature of this invention is the elimination of a moving support platen for the film. The disclosed densitometer utilizes a stationary curved platen which enables the film strip being scanned to remain in a stationary position. This has the advantage of allowing the density of a film strip to be scanned without having to cut the film from a source. For instance, the density of a film strip in the middle of a long roll of film can be scanned very easily by positioning the interested portion on the curved stationary platen and maintaining the film reels on either side of the interested portion conveniently on the densitometer.

The rigid pivotal scanning arm which carries both the scanning system and the recording system assures a high accuracy in the correlation of the film strip and the resulting density recording. As the scanning system and the recording system are mechanically linked on one rigid arm, the drive system which may be utilized to drive the scanning arm need not be either highly accurate or sensitive. Slight changes in the speed of the drive system or vibrations in the drive system have less of an effect upon the accuracy of the density recording than if another arrangement were used.

DETAILED DESCRIPTION OF THE INVENTION

Figure 1:
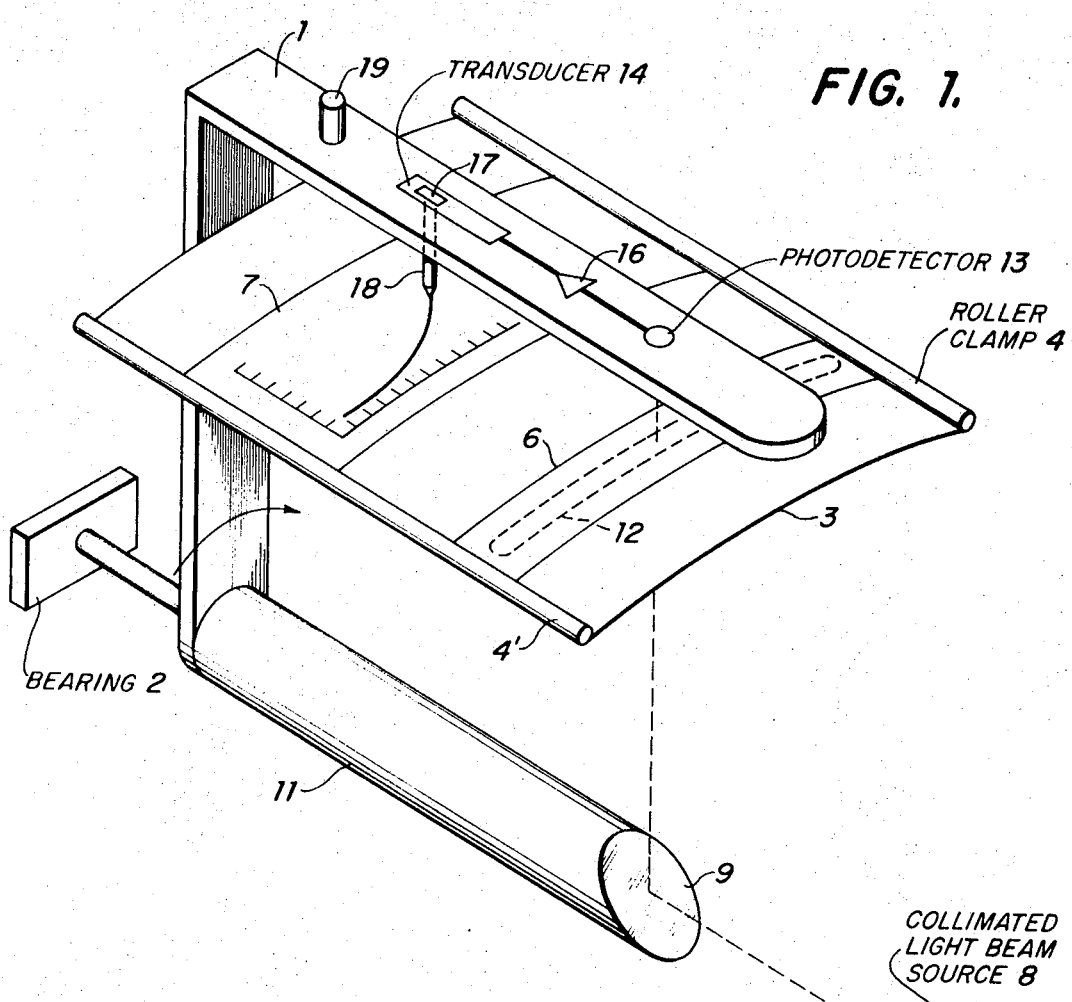
FIG. 1 shows a schematic illustration of a first embodiment of the densitometer.

Referring to FIG. 1, an embodiment of the invention is shown in which pivotal scanning arm 1 is supported by bearing 2. A film strip 6 is mounted upon a first portion of a curved support platen 3 while a piece of graph paper 7 is mounted upon a second portion of the curved support platen 3. Roller clamps 4 and 4' hold the film strip 6 and graph paper 7 in place on the curved support platen. A light beam source 8 directs a narrow beam of light at mirror surface 9 which is mounted upon cylinder 11 which is in turn rigidly affixed to pivotal arm 1. The beam of light reflected off mirror 9 passes through an elongated window 12 formed in support platen 3, and impinges upon photodetector 13 which is mounted on pivotal scanning arm 1. Photodetector 13 may be a photomultiplier tube or any light sensitive device which converts light intensity into a proportional electrical signal.

Figure 2:
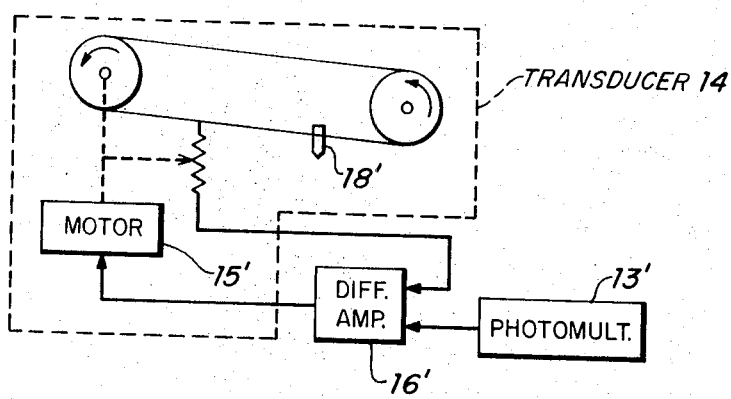
FIG. 2 is a schematic diagram of a possible servosystem which may be used to drive the recording transducer illustrated in FIG. 1.

In one embodiment of the invention, a photomultiplier tube circuit is arranged to maintain the current through the tube constant regardless of light intensity variations (see *Dumont Photomultiplier Tube Handbook*, Fourth Edition, page 29). Accordingly, the output signal will be proportional to the log of the input signal, which will in turn control the Y position of the recording pen so that the Y coordinate of the graph will represent the log of the transmitted radiation. Alternatively, a log amplifier may be utilized. The output of the circuit of photodetector 13 is coupled via amplifier 16 to the input of the circuit for recording transducer 14. Recording transducer 14 may be a device such as is shown in FIG. 2, or may be any other commercially available device for converting voltage or current into a proportional translational position of armature 17, which has a recorder such as a ballpoint or fiber-tipped or ink-type pen 18 affixed thereto. FIG. 2 discloses the details of one possible recording transducer circuit. Photomultiplier tube 13' applies a control signal to differential amplifier 16', which causes the pulley motor 15' to rotate until the feedback voltage produced by the potentiometer equal the photomultiplier voltage. This conventional servo-loop causes recording pen 18' to assume a position proportional to the photomultiplier output signal.

In operation, as scanning arm 1 is displaced across curved platen 3, the film strip is scanned and the D-log E curve is automatically recorded upon medium 7. Scanning arm 1 may be automatically moved along the support platen via a motor, or a handle 19 may be provided to facilitate manual scanning.

Figure 3:
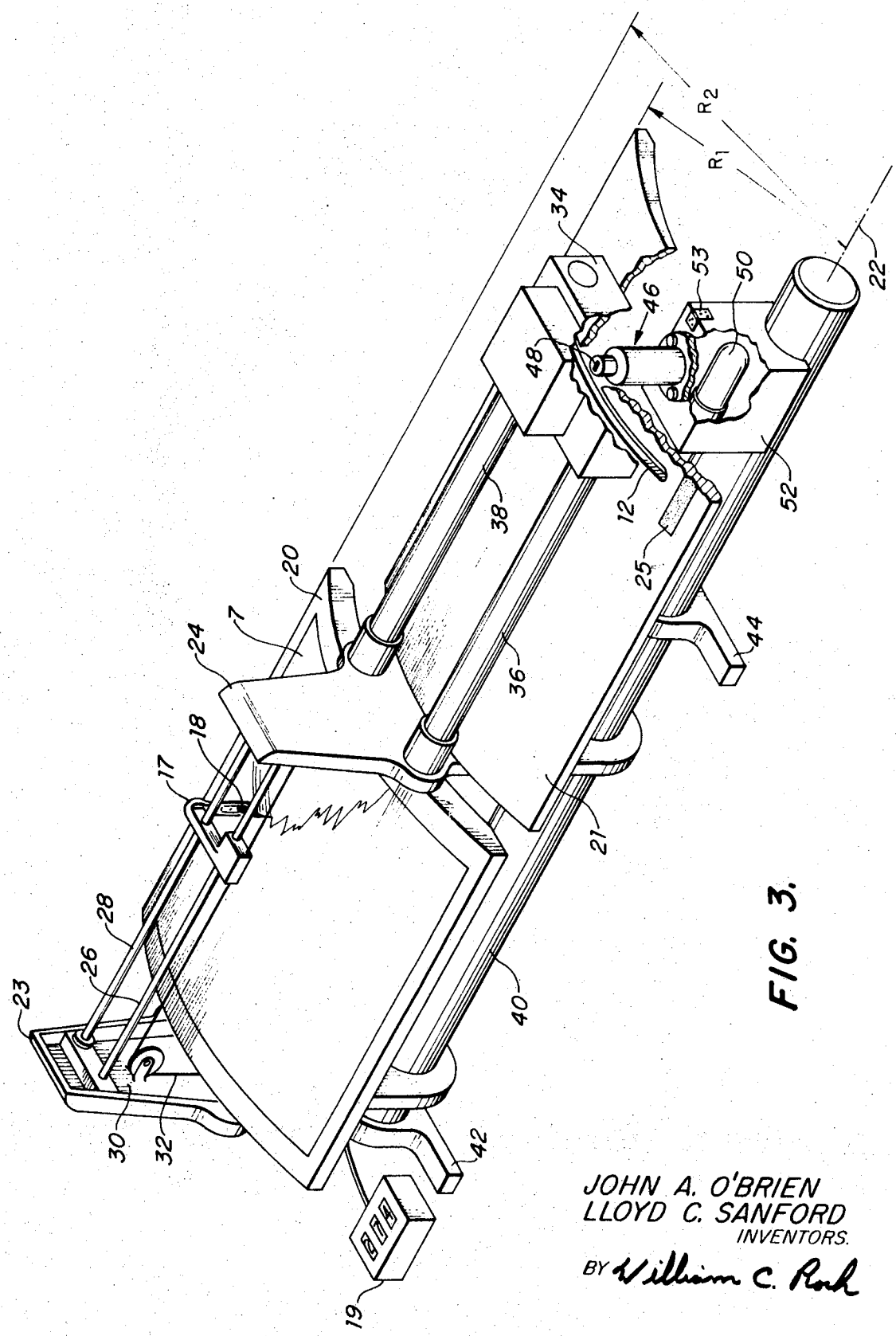
FIG. 3 is a perspective view, partially in section, of another embodiment of the densitometer of this invention.

Referring to FIG. 3, there is illustrated another embodiment of the invention. Support platen 3 is divided into a first portion 20, upon which rests the graph paper 7, and a second portion 21, upon which the film strip, not shown, is placed. The film strip is held against the support platen by adhesive sections 25 which are located adjacent the ends of slot 12. Adhesive sections 25 are formed of commercially available adhesive material, the stickiness of which can be reactivated by the application of a solvent. The first portion 20 of the support platen is centered about central axis 22 in a cylindrical plane having a radius $R_2$. The second portion 21 of the support platen is centered about central axis 22 in a cylindrical plane having a radius $R_1$. Radius $R_2$ is larger than radius $R_1$, and the mechanical advantage of the larger radius $R_2$ enables the density to be recorded on a graph having a longer abscissa than the length of the film strip. The longer abscissa allows more uniform and higher resolution increments in the density plot. In alternative embodiments the difference between the radii $R_1$ and $R_2$ may be selectively chosen to vary the relationship between the abscissa and the length of the film strip. The pivotal scanning arm has a first frame section 23 and a second frame section 24. Rods 26 and 28 extend between frame sections 23 and 24 and support the recording transducer 17 which has a stylus 18. Stylus 18 may be constructed with a turret having several colored recording pens, any one of which may be rotated into a recording position to enable the densitometer to draw a graph with colored ink when the density of that color is being determined. The motor which drives the recording transducer 17 is located beneath platen section 20, and is not shown directly. The response of the motor is coupled to recorded transducer 17 by cabling system 32 which runs up from beneath platen section 20 and back and forth between frame members 23 and 24. The instantaneous density reading of the densitometer may also be indicated by a digital volt meter 19. Rod members 36 and 38, which are attached in cantilever fashion to frame section 24, support housing 34 for movement along the rods. Housing 34, which encloses a light source, would be moved along rods 36 and 38 if it were desired to replace the film strip or to directly view the film strip. Frame sections 23 and 24 are directly attached to main shaft 40 which is centered on axis 22. Main shaft 40 is supported for rotation by support members 42 and 44, each of which has a bearing to rotationally support shaft 40. Beneath the second portion 21 of the curved support platen there is located the collecting optical assembly 46 with a scanning aperture 48. Light is directed from the optical housing 34 through aperture 12, then through a film strip, not shown, through scanning aperture 48 of collecting optical assembly 46 to photomultiplier tube 50. Collecting optical assembly 46 is mounted on top of housing 52, which is a lighttight assembly for the enclosure of photomultiplier tube 50. Housing 52 is in turn firmly mounted upon shaft 40 for rotation therewith. Housing 52 has hinges 53, only one of which is shown, to allow access to the filter assembly illustrated in FIG. 5.

Figure 4:
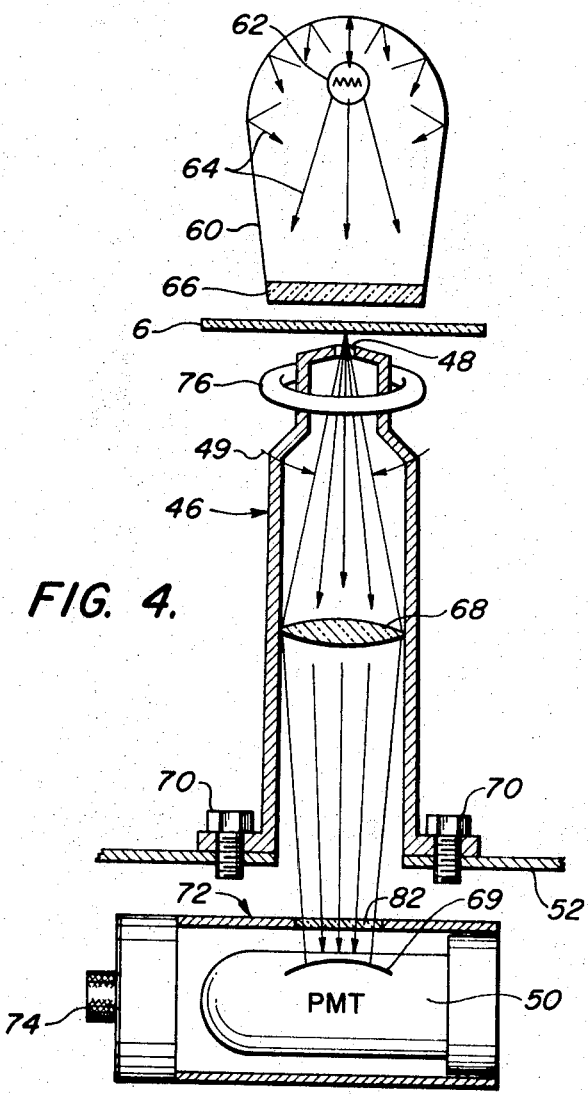
FIG. 4 is a schematic illustration, partially in section, of the scanning optics used in the embodiment shown in FIG. 3.

Referring to FIG. 4, there is illustrated a schematic illustration of the scanning optics used in the embodiment shown in FIG. 3. In this embodiment enclosure 60 forms a modified integrating sphere for light source 62 which is located therein. Light source 62 may be a low voltage tungsten lamp, and the inside of enclosure 60 may be painted with white, photometric sphere-paint. Light rays 64 emanate from illumination source 62, and are partially integrated therein and directed down against a diffuser element 66, which may be constructed of opal glass. The light then passes through film strip 6 into collection aperture 48 and then to a lens element 68 which collects the light through an angle 49 and directs the light down through a filter 82 to the light sensitive dynodes 69 of the photomultiplier tube 50. Collection optical element 46 is fastened to housing 52 via screws 70. This removable fastening allows the collecting optical assembly 46 to be replaced with alternate collecting optical assemblies. Alternate collecting optical assemblies may be desired to enable the dimensions of collection aperture 48 to be changed, or to vary the angle 49 over which light from the film strip is collected. Factors which may be varied are specified by art recognized national standards on the measurement of diffuse transmission density and diffuse reflection density, although other embodiments of the invention may be built which do not conform to these standards.

FIG. 4 also illustrates light source 76 surrounding the neck of collecting optical assembly 46. This light source would be activated by a control switch instead of light source 62 if diffuse reflection density were being measured. Light source 76 is illustrated as being a unitary ring around the neck of collecting optical assembly 46, but may in alternate embodiments be a different lighting arrangement, such as a series of discrete light sources surrounding the neck of collecting optical assembly 46. The parameters on the construction of and position of light source 76 relative to film 6 and collection aperture 48 are specified by art recognized national standards, although alternate embodiments may be built.

Figure 5:
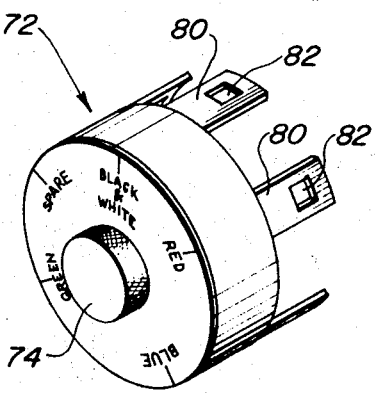
FIG. 5 is a perspective view of the filter which surrounds the photomultiplier tube, and enables the densitometer to scan and record the density of a particular color.

FIG. 5 illustrates an embodiment of a filter assembly which may be utilized to measure the density of a particular color. Filter assembly 72 is positioned around photomultiplier tube 50, as illustrated in FIG. 4, and has a number of filter sections 82 supported in individual filter supports 80. The filter assembly 72 may be rotated so that any one of the filters 82 may be positioned in the light path of the densitometer. Filter assembly 72 is replaceable by other filter assemblies, having different filters. Filter sections 82 may be provided for any color, any type of film, and for either reflection or transmission density. In one embodiment there are six filter sections 80 positioned around filter assembly 72. There is one filter section for measuring either red, blue or green density in a negative color film, and one filter section for measuring either red, blue or green density in a transparency color film. In alternative embodiments other filter sections may be added to attenuate the total amount of light which is passed to the photomultiplier tube.

In yet another embodiment different from that illustrated in FIGS. 4 and 5, dichroic mirrors may be positioned in the light path to reflect a particular color to one photodetector while allowing the remaining colors to be passed through the mirror to another dichroic mirror or another photodetector, etc.

Figure 6:
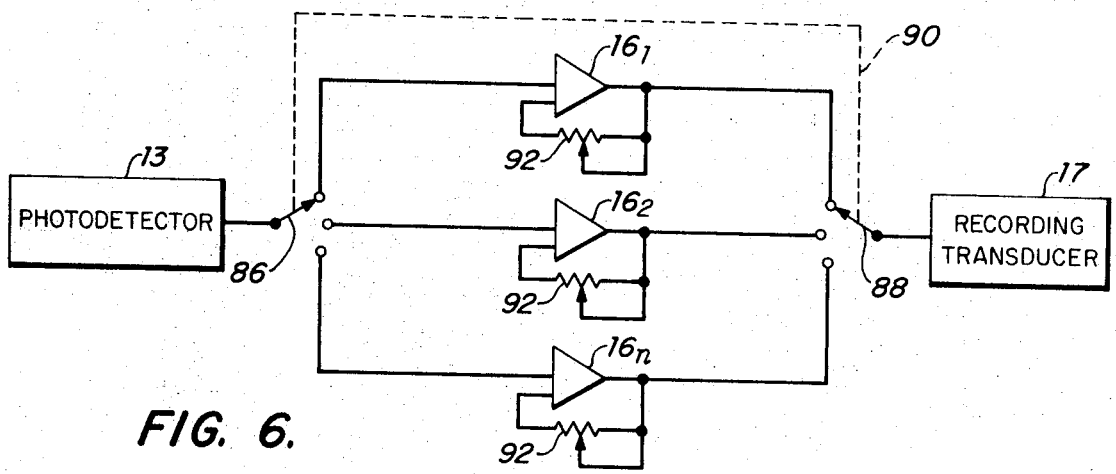
FIG. 6 is a schematic illustration of an electrical system which may be used to compensate for the varying responses of the optical system.

FIG. 6 is a schematic illustration of one embodiment of an electrical system which may be utilized to compensate for the varying responses of the optical system. Depending upon which collecting optical assembly 46 is positioned in the densitometer and which filter element 82 is positioned in the optical path of the densitometer, the response of the photomultiplier tube to a given density, either color or blank and white, will vary greatly. A number of alternately selectable amplifier circuits $16_1$–$16_n$ are available in the densitometer to enable the varying response characteristics of the system to be compensated for, and to enable the densitometer to be calibrated for a particular combination of a given light source, a given collecting optical assembly, and a given filter. As illustrated in FIG. 6, multiple pole switches 86 and 88 are mechanically ganged together to couple the output of photodetector 13 to a particular amplifier circuit $16_n$, and to couple the output of that particular amplifier circuit to recording transducer 17. Each amplifier circuit $16_n$ has a variable resistor in a feedback circuit which enables more gain in the amplifier when less voltage or current is fed back to the amplifier input.

Although many embodiments of the invention has been illustrated, many more will occur to those skilled in the art when considering the teachings of this invention.

What is claimed is:

1. A densitometer for determining the density of a particular color in a given medium comprising:
   a. a fixed, curved support platen having a first portion for supporting a medium, the density of which is to be determined, and a second portion for supporting a recording medium;
   b. a rigid, pivotal arm;
   c. means for supporting said pivotal arm to enable said arm to travel in an arcuate path parallel to the surface of said support platen;
   d. scanning means, including said pivotal arm and a radiation source to irradiate the medium and a radiation detector for detecting radiation from the medium, for producing an electrical signal indicative of the density of a particular color in the medium as said pivotal arm travels in said arcuate path and scans the medium;
   e. recording means, including a recording transducer mounted upon said arm adjacent said second portion of said support platen, for making a continuous recording on said recording medium indicative of said electrical signal; and
   f. means for electrically coupling the output of said radiation detector to the input of said recording means, whereby as said medium is scanned, the recording transducer simultaneously records, the density of a particular color in the medium on said recording medium.

2. Apparatus as set forth in claim 1 wherein said scanning means includes means for selectively producing an electrical signal indicative of either the red, green, or blue density of the medium.

3. Apparatus as set forth in claim 2 wherein said means for electrically coupling the output of said radiation detector to the input of said recording means includes adjustable circuit means for compensating for the varying response of the densitometer to either the red, green or blue density of the medium.

4. Apparatus as set forth in claim 2 wherein said means for selectively producing an electrical signal indicative of either the red, green, or blue density includes: a cylindrical filter assembly surrounding said radiation detector, said cylindrical assembly having a filter for red density, a filter for blue density, and a filter for green density and means for supporting said filter assembly for rotation, whereby said cylindrical filter assembly may be selectively rotated to position a particular filter in front of said radiation detector.

5. Apparatus as set forth in claim 4 wherein said cylindrical filter assembly includes red, green, and blue filters for negative color film, and red, green, and blue filters for transparency color film.

6. Apparatus as set forth in claim 1 wherein said scanning means includes a removable optical assembly positioned between the medium and the radiation detector for collecting light from the medium and for directing it to the radiation detector, whereby a particular optical assembly may be removed and replaced with another optical assembly having different optical characteristics.

7. Apparatus as set forth in claim 6 wherein said means for electrically coupling the output of said radiation detector to the input of said recording means includes adjustable circuit means for compensating for the different optical characteristics of different optical assemblies.

8. Apparatus as set forth in claim 1 wherein said first portion of the fixed, curved support platen has a radius $R_1$, and said second portion of the fixed, curved support platen has a radius $R_2$, the radius $R_2$ being greater than the radius $R_1$, whereby the greater mechanical advantage of radius $R_2$ allows the density to be recorded on a recording medium having a longer abscissa than the length of the medium.

9. Apparatus as set forth in claim 1 wherein said means for electrically coupling the output of said radiation detector to the input of said recording means includes adjustable circuit means for compensating for the varying response of the densitometer to particular colors.

10. A densitometer for determining the reflection density of a given medium comprising:
    a. a fixed, curved support platen having a first portion for supporting a medium, the density of which is to be determined, and a second portion for supporting a recording medium;
    b. a rigid, pivotal arm;
    c. means for supporting said pivotal arm to enable said arm to travel in an arcuate path parallel to the surface of said support platen;
    d. scanning means, including said pivotal arm and a radiation source to irradiate the medium and a radiation detector for detecting radiation reflected from the medium, for producing an electrical signal indicative of the reflection density of the medium as said pivotal arm travels in said arcuate path and scans the medium;
    e. recording means, including a recording transducer mounted upon said arm adjacent said second portion of said support platen, for making a continuous recording on said recording medium indicative of said electrical signal; and
    f. means for electrically coupling the output of said radiation detector to the input of said recording means, whereby as said medium is scanned, the recording transducer simultaneously records the density of the medium on said recording medium.

11. Apparatus as set forth in claim 10 wherein said scanning means includes means for producing an electrical signal indicative of the reflection density of a particular color in the medium.

12. Apparatus as set forth in claim 11 wherein said means for electrically coupling the output of said radiation detector to the input of said recording means includes adjustable circuit means for compensating for the varying response of the densitometer to particular colors.

13. Apparatus as set forth in claim 11 wherein said scanning means includes means for selectively producing an electrical signal indicative of either the red, green, or blue reflection density of the medium.

14. Apparatus as set forth in claim 13 wherein said means for selectively producing an electrical signal indicative of either the red, green, or blue reflection density includes: a cylindrical filter assembly surrounding said radiation detector, said cylindrical filter assembly having a filter for red reflection density, a filter for blue reflection density and filter for green reflection density; and means for supporting said filter assembly for rotation, whereby said cylindrical filter assembly may be selectively rotated to position a particular filter in front of said radiation detector.

15. Apparatus as set forth in claim 10 wherein said scanning means includes a removable optical assembly positioned between the medium and the radiation detector for collecting light reflected from the medium and for directing it to the radiation detector, whereby a particular optical assembly may be removed and replaced with another optical assembly having different optical characteristics.

16. Apparatus as set forth in claim 15 wherein said means for electrically coupling the output of said radiation detector to the input of said recording means includes adjustable circuit means for compensating for the different optical characteristics of different optical assemblies.

17. Apparatus as set forth in claim 10 wherein said first portion of the fixed, curved support platen has a radius $R_1$, and said second portion of the fixed, curved support platen has a radius $R_2$, the radius $R_2$ being greater than the radius $R_1$, whereby the greater mechanical advantage of radius $R_2$ allows the density to be recorded on a recording medium having a longer abscissa than the length of the medium.